(12) United States Patent
McHugh et al.

(10) Patent No.: US 9,804,002 B2
(45) Date of Patent: Oct. 31, 2017

(54) INTEGRAL SENSOR (71) Applicant: Cameron International Corporation, Houston, TX (US)

(72) Inventors: Edmund McHugh, Longford (IE); Michael D. Mullin, Athlone (IE)

(73) Assignee: Cameron International Corporation, Houston, TX (US)

(*) Notice: Subject to any disclaimer, the term of this patent is extended or adjusted under 35 U.S.C. 154(b) by 689 days.

(21) Appl. No.: 14/018,057

(22) Filed: Sep. 4, 2013

(65) Prior Publication Data
US 2015/0059472 A1    Mar. 5, 2015

(51) Int. Cl.
G01D 21/00 (2006.01)
G01L 9/06 (2006.01)
G01L 9/00 (2006.01)
G01D 11/24 (2006.01)

(52) U.S. Cl.
CPC .......... *G01D 11/245* (2013.01); *G01L 9/0007* (2013.01); *Y10T 29/49117* (2015.01); *Y10T 29/49826* (2015.01)

(58) Field of Classification Search
CPC .............. G01D 11/245; G01L 19/0007; G01L 19/0023; G01L 19/0645; G01F 1/34; G01F 1/206
USPC ......................................................... 73/431
See application file for complete search history.

(56) References Cited

U.S. PATENT DOCUMENTS

| | | | | |
|---|---|---|---|---|
| 4,840,068 A | * | 6/1989 | Mayhew, Jr. | G01L 19/0046 73/706 |
| 5,515,733 A | * | 5/1996 | Lynnworth | G01F 1/662 73/644 |
| 6,076,409 A | * | 6/2000 | Bang | G01L 19/0038 73/756 |
| 6,227,055 B1 | * | 5/2001 | Pitzer | G01L 19/0061 73/715 |
| 6,311,561 B1 | * | 11/2001 | Bang | G01L 9/0073 73/708 |
| 6,604,429 B1 | * | 8/2003 | Pitzer | G01L 19/147 73/715 |
| 6,932,154 B2 | | 8/2005 | Zillinger | |
| 7,278,480 B2 | | 10/2007 | Longfield et al. | |
| 7,413,018 B2 | | 8/2008 | Hosie et al. | |
| 2001/0009504 A1 | * | 7/2001 | Lee | H05K 7/142 361/729 |
| 2003/0024321 A1 | * | 2/2003 | Burczyk | G01L 19/0645 73/756 |
| 2004/0182147 A1 | * | 9/2004 | Rambow | E21B 47/06 73/152.14 |

(Continued)

OTHER PUBLICATIONS

Copenheaver, International Search Report and Written Opinion for PCT/US2014/053805, dated Dec. 17, 2014.

*Primary Examiner* — Helen Kwok
(74) *Attorney, Agent, or Firm* — Eubanks PLLC (57) ABSTRACT An integral sensor system is provided. In one embodiment, the system includes a sensor installed in a carrier and a component having a body for receiving a fluid. The carrier is integrated into the component to enable the sensor to detect one or more characteristics of the fluid, and the carrier is integrated into the component such that an interface between the carrier and the component is a fully integral pressure boundary without a seal connection between the carrier and the component. The carrier can be welded to the component to form the integral pressure boundary. Additional systems, devices, and methods are also disclosed.

19 Claims, 8 Drawing Sheets

(56) References Cited

U.S. PATENT DOCUMENTS

| | | | |
|---|---|---|---|
| 2004/0246141 A1* | 12/2004 | Tubel | E21B 47/16 340/854.3 |
| 2005/0103111 A1* | 5/2005 | Imai | G01L 9/0055 73/715 |
| 2005/0248434 A1* | 11/2005 | Kurtz | B23K 15/0053 338/42 |
| 2006/0213276 A1* | 9/2006 | Ueyanagi | G01L 19/0084 73/754 |
| 2007/0227727 A1* | 10/2007 | Patel | E21B 17/028 166/250.01 |
| 2008/0148860 A1* | 6/2008 | Murakami | G01L 9/0002 73/726 |
| 2008/0156402 A1* | 7/2008 | Coleman | B23K 35/004 148/527 |
| 2008/0223142 A1* | 9/2008 | Iimori | G01L 9/0051 73/726 |
| 2009/0266175 A1* | 10/2009 | Monmont | E21B 43/24 73/861.04 |
| 2009/0308168 A1* | 12/2009 | Motoyama | G01L 9/0022 73/717 |
| 2010/0083768 A1* | 4/2010 | Hedtke | G01L 27/007 73/724 |
| 2010/0275699 A1* | 11/2010 | Seeberg | G01L 19/0092 73/756 |
| 2011/0079086 A1* | 4/2011 | Romo | G01L 19/146 73/756 |
| 2011/0126912 A1* | 6/2011 | Grimseth | E21B 33/0355 137/1 |
| 2012/0048023 A1* | 3/2012 | Kurtz | G01L 15/00 73/727 |
| 2012/0048038 A1* | 3/2012 | Furlong | G01L 19/0007 73/866.5 |
| 2013/0283928 A1* | 10/2013 | Wiklund | G01K 1/08 73/861.18 |

* cited by examiner

INTEGRAL SENSOR

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in finding and extracting oil, natural gas, and other subterranean resources from the earth. Particularly, once a desired subterranean resource such as oil or natural gas is discovered, drilling and production systems are often employed to access and extract the resource. These systems may be located onshore or offshore depending on the location of a desired resource and can include a variety of pressure-containing components, such as wellheads, casings, Christmas trees, pipes or other conduits, and valves, for routing fluids from a well. Operating characteristics of the system, such as pressure and temperature within one or more of the system components, can be measured with sensors and the system can be controlled based on the measured characteristics.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present disclosure generally relate to integration of sensing devices into pressure-containing components. In some embodiments, sensing devices include one or more sensors installed in carriers that are welded into valves, pipes, Christmas trees, casings, and wellheads. The carriers can include flanges to be inserted into recesses of the components and welded to the components. By integrating the sensing devices into the components, the interfaces of the sensing devices and the components can be provided as fully integrated pressure barriers that eliminate potential leak paths associated with elastomeric gaskets or other separate seal elements.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Figure 1:
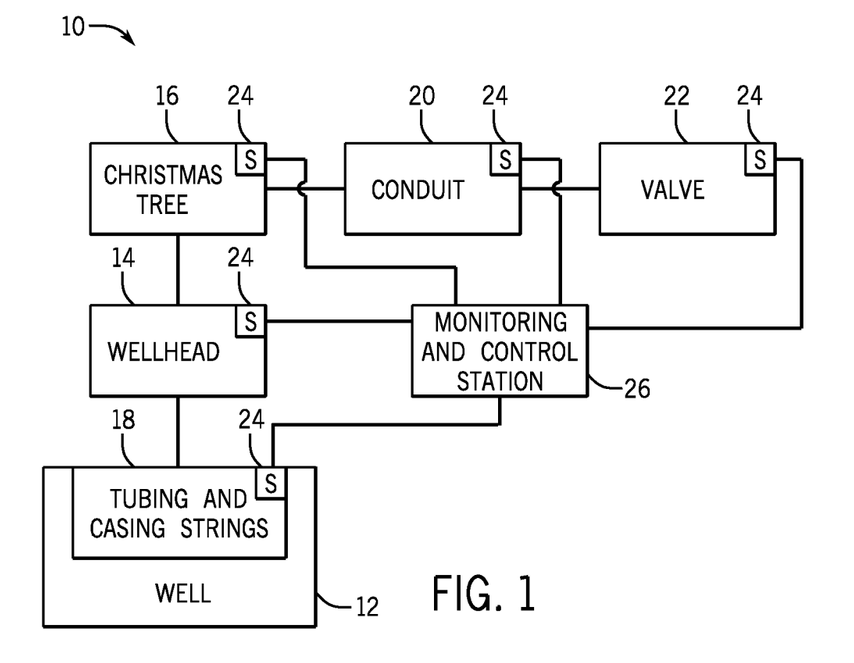
FIG. 1 generally depicts a production system having various components with sensing assemblies for monitoring operating characteristics in accordance with one embodiment of the present disclosure.

Turning now to the present figures, a system 10 is illustrated in FIG. 1 in accordance with one embodiment. Notably, the system 10 is a production system that facilitates extraction of a resource, such as natural gas or oil, from a reservoir through a well 12. A wellhead 14 and a Christmas tree 16 are installed at the well. The wellhead 14 can include various casing and tubing heads, and the Christmas tree 16 can include various pipes, fittings, valves, and gauges that allow control of fluids rising from the well 12. As depicted, the system 10 also includes tubing and casing strings 18, a conduit 20 (e.g., a flowline from the Christmas tree 16) and a valve 22 for regulating flow through the conduit 20. In one embodiment, the system 10 is a surface installation in which the wellhead 14, the Christmas tree 16, the conduit 20, and the valve 22 are each provided on land. But in other embodiments, some or all of these components are instead provided on a seabed.

The system 10 further includes sensing assemblies 24 that enable monitoring of conditions at various components. The sensing assemblies 24 can monitor pressure and temperature of fluid taken from the well 12, for example. As depicted in FIG. 1, separate sensing assemblies 24 are included for the wellhead 14, the Christmas tree 16, the tubing and casing strings 18, the conduit 20, and the valve 22, but it will be appreciated that not each of the components would have a sensing assembly in other embodiments. Further, other systems could include additional components having sensing assemblies 24, such as downhole tools positioned in a well. The depicted system 10 also includes a monitoring and control station 26 for receiving signals from the sensing assemblies 24 and controlling operation of the system 10. The monitoring and control station 26 can take any suitable form, such as a computer with a processor that executes instructions stored in a memory device to automatically control operation of the system 10 based in part on the received inputs from the sensing assemblies 24.

The sensing assemblies 24 can also take various forms. In one embodiment generally depicted in FIG. 2, the sensing assembly includes a pressure sensor 28, a temperature sensor 30, a processor 32, a communication interface 34, and a battery 36. As shown here, the pressure sensor 28 and the temperature sensor 30 are provided together in a detector module 38 (e.g., a single package having both sensors), while the processor 32, the communication interface 34, and the battery 36 are provided together in an electronics module 40.

Figure 2:
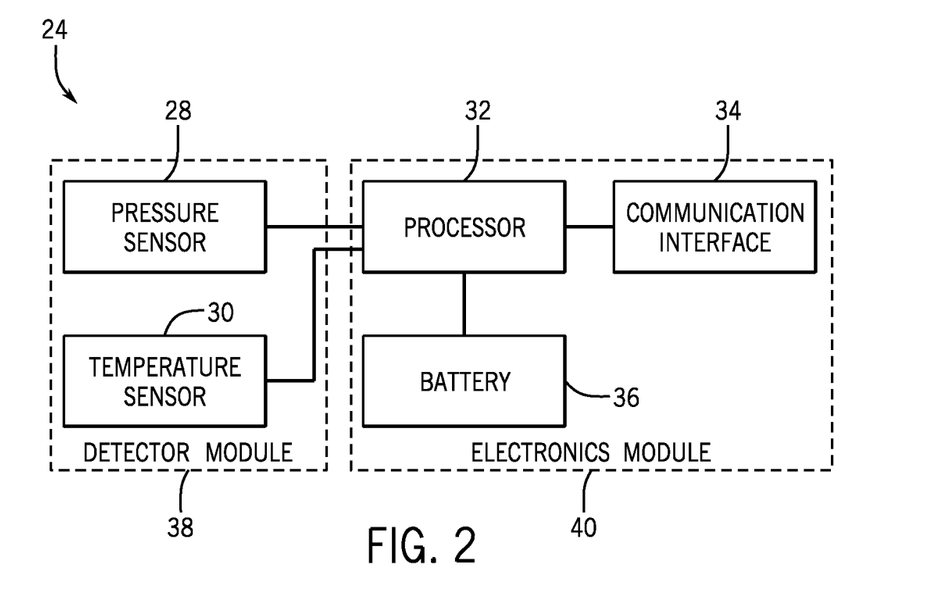
FIG. 2 is a block diagram representative of a sensing assembly having a detector module and an additional electronics module in accordance with one embodiment.

As will be appreciated, the pressure sensor 28 and the temperature sensor 30 could be used to measure pressure and temperature in harsh operating conditions (e.g., high temperature or pressure). Components of the electronics module 40 may be more susceptible to failure caused by such harsh operating conditions than components of the detector module 38. To improve longevity of the sensing assembly 24, the electronics module 40 can be positioned apart from the detector module 38. For instance, the detector module 38 can be installed at a location with a relatively high temperature, while the electronics module 40 can be installed at a location with a lower temperature. By positioning the electronics module 40 remote from the detector module 38 in this manner, the temperature working range of the pressure sensor 28 can be widened.

In some embodiments, the pressure sensor 28 includes a strain gauge and the temperature sensor 30 includes a resistance temperature detector. The processor 32 can be used to determine the pressure and the temperature in conjunction with the sensors 28 and 30, such as by correlating electrical resistances of the strain gauge and of the resistance temperature detector with pressure and temperature. One or more batteries 36 or other power sources can provide power to the components of the sensing assembly 24. The communication interface 34 enables the sensing assembly 24 to communicate with other devices (e.g., monitoring and control station 26), allowing measured parameters from the detector module 38 to be relayed to such other devices. In some embodiments, the communication interface 34 includes a wireless modem that enables wireless transmission of measurement data collected by the detector module 38. Although not presently shown, the sensing assembly can also include other circuitry (e.g., a memory device for storing measured parameters and executable instructions for the processor 32, other sensors, and an analog-to-digital converter).

While one example of a sensing assembly 24 is depicted in FIG. 2, sensing assemblies 24 of other embodiments could differ. For example, the pressure sensor 28 and the temperature sensor 30 can be provided separate from one another. Other embodiments could include only one sensor (e.g., the pressure sensor 28, the temperature sensor 30, or some other sensor) or could include more sensors than depicted in FIG. 2. Further, while the electronics module 40 is described above as being provided separate from the detector module 38, in other embodiments all of the components of the sensing assembly 24 could be provided together in a single package.

Figure 3:
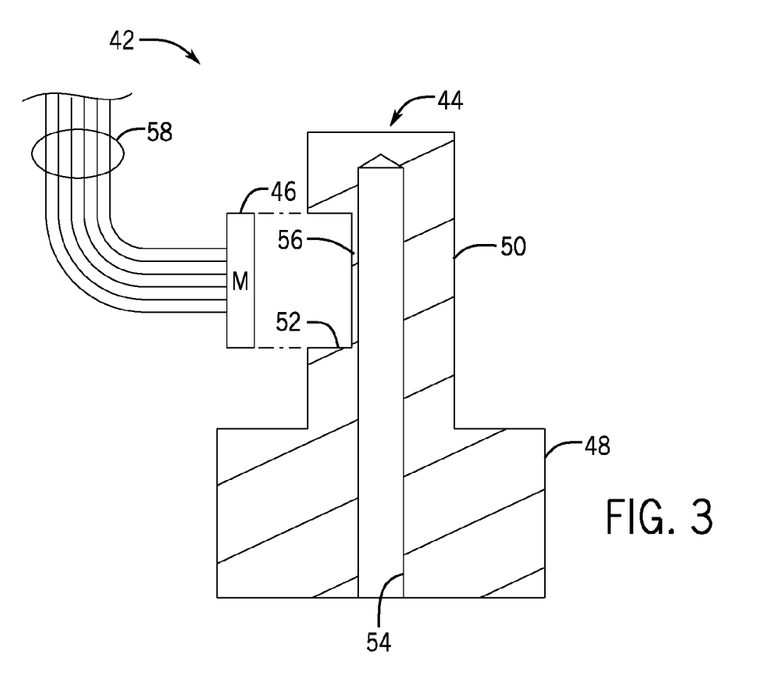
FIGS. 3 and 4 are cross-sections of sensing devices each having a sensor module installed in a carrier in accordance with certain embodiments.

Turning now to FIG. 3, a sensing device 42 is depicted as having a carrier 44 (also referred to as a sensor housing) that receives a sensor module 46. The sensor module 46 includes one or more sensors for measuring parameters of interest, such as temperature and pressure. The sensor module 46 in one embodiment is identical to the detector module 38 of FIG. 2 (i.e., having both a pressure sensor 28 and a temperature sensor 30 in a single package separate from other electronics). But other configurations for the sensor module 46 are also contemplated. For instance, the sensor module 46 could include only a temperature sensor or only a pressure sensor.

The depicted carrier 44 includes a flange 48 and a stem 50. The flange 48 can facilitate installation of the carrier 44 into a larger component, as described in more detail below. In some other embodiments, however, the carrier 44 can be provided without a flange 48. The sensor module 46 is inserted into a recess 52. The carrier 44 also includes a bore 54 separated from the recess 52 by a wall 56. The sensor module 46 can include a strain gauge that is positioned along the wall 56 so that deformation of the wall 56 due to pressure of fluid within the bore 54 can be measured. The carrier 44 can also be formed of a material with high thermal conductivity to aid in measuring temperature of fluid in the bore 54 (and about the face of the carrier 44 through which the bore 54 is formed) by the sensor module 46.

Figure 4:
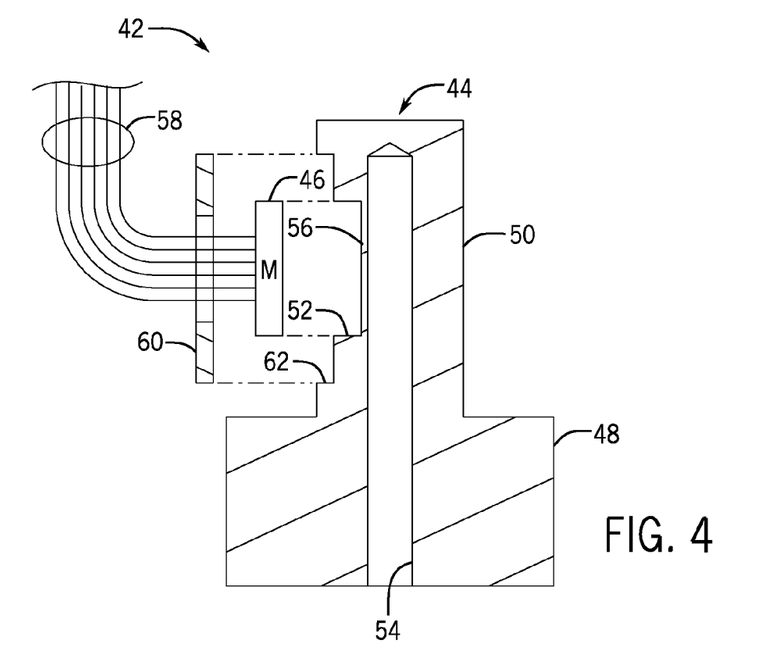

The sensor module 46 is electrically coupled to other components (e.g., a remotely positioned electronics module 40 for processing signals from the sensor module 46) via wires 58. Six wires 58 are shown in the present figure (e.g., four for a strain gauge and two for a resistance temperature detector). But any number of wires could be used in other applications, with the number of wires depending on the configuration of the sensor module 46. The sensor module 46 can be secured to the carrier 44 in any suitable manner. For example, the sensor module 46 shown in FIG. 3 is bonded to the carrier 44 with an adhesive. In another embodiment, a retaining ring 60 could be inserted into a counterbore 62 with an interference fit to hold the sensor module 46 within the recess 52, as generally depicted in FIG. 4. But other manners of installing the sensor module 46 could of course be used.

Figure 5:
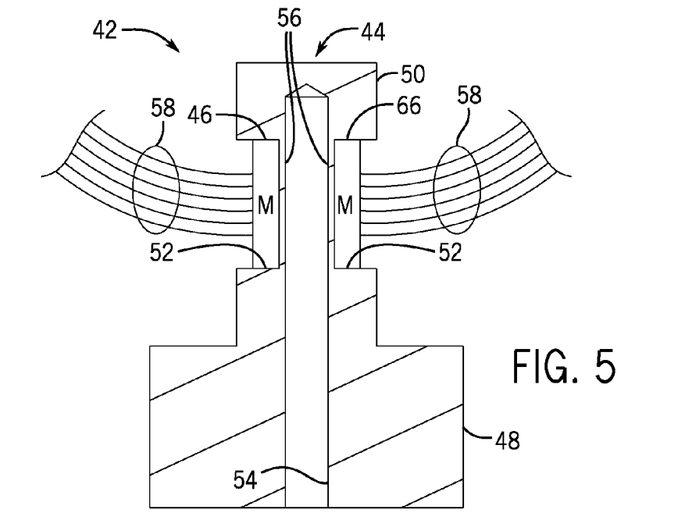
FIG. 5 generally depicts the inclusion of multiple sensor modules in the carrier of FIG. 3 in accordance with another embodiment.

In some embodiments, the carrier 44 holds multiple sensor modules. For example, in FIG. 5 the sensing device 42 is illustrated with both the sensor module 46 and an additional sensor module 66. The sensor module 66 could be identical to the sensor module 46, providing a dual, redundant sensing capability. But the sensor modules 46 and 66 could instead include different sensors. For instance, in one embodiment each of the sensor modules 46 and 66 includes a single sensor, such as a pressure sensor in one of the modules and a temperature sensor in the other.

The sensing device 42 can be installed, in any suitable manner, at a pressure-containing vessel, such as a component of the wellhead 14, the Christmas tree 16, a casing or tubing string 18, the conduit 20, or the valve 22. The sensing device 42 could be fastened to such a component and include a sealing element (e.g., an elastomeric gasket) to inhibit leaking from the connection between the component and the sensing device 42. But in at least some embodiments of the present technique the sensing device 42 is instead installed as an integral part of the pressure-containing component. Particularly, the carrier 44 is integrated into the component such that an interface between the carrier and the component is a fully integral pressure boundary without a seal connection between the carrier and the component. The pressure-containing component is an oilfield component in at least some embodiments, and in at least some instances the integration of the sensing device 42 into the component reduces size and weight of the apparatus (e.g., by allowing an instrument hook-up flange to be omitted from the component).

Figure 6:
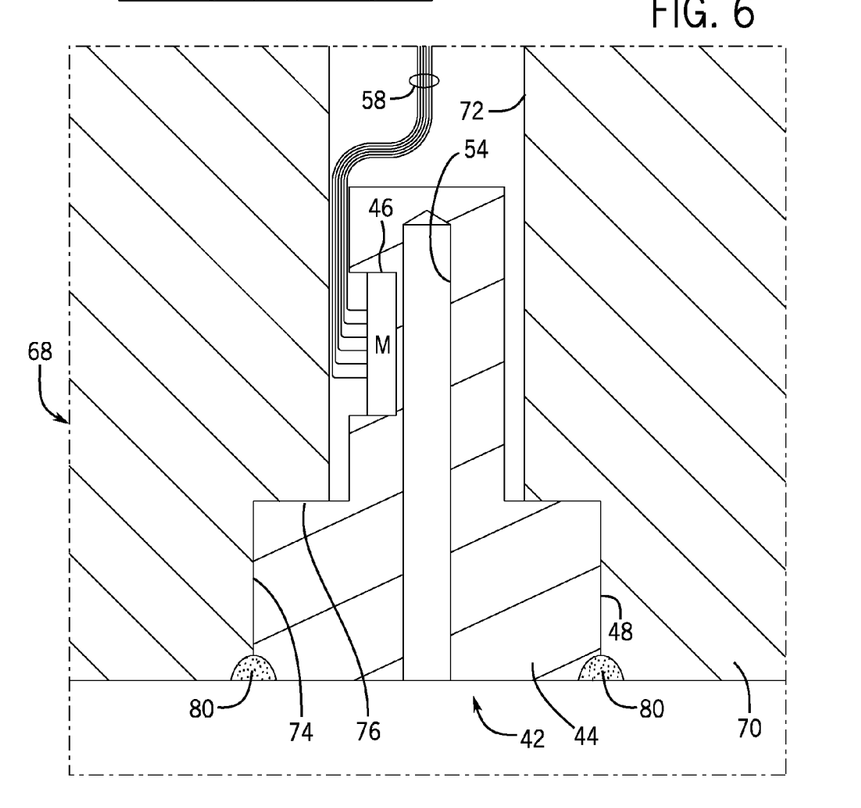
FIGS. 6 and 7 are cross sections of the sensing device of FIG. 3 integrated into the body of a component to form a fully integral pressure boundary in accordance with certain embodiments.

One example of an integrated sensing device 42 is depicted in FIG. 6. In this embodiment, a component 68 includes a wall 70 having a bore 72. The sensing device 42 is inserted into the bore 72 with the flange 48 received in a recess or counterbore 74 and abutting a shoulder 76. The wires 58 permit communication of the sensor module 46 with other devices, such as an electronics module 40. The positioning of the sensor module 46 within the bore 72 also allows the body (e.g., the wall 70) of the component 68 to protect the sensor module 46 from impact.

The carrier 44 is welded to the wall 70, as generally indicated by weld 80. Although only shown in cross section here, it will be appreciated that the entire perimeter of the carrier 44 is welded to the wall 70 to form an integral pressure boundary at the interface of the carrier 44 and the wall 70. Integrally joining the carrier 44 and the wall 70 allows the carrier 44 to be used without a seal connection between the carrier 44 and the wall 70 and eliminates potential leak paths associated with such seals while enabling containment of pressurized fluid within the component 68. That is, the integration of the carrier 44 into the component 68 allows inclusion of the sensing device 42 while avoiding any penetration into the bore of the component 68 that could allow fluid to leak from the component along a connection with the sensing device 42.

Any suitable welding technique, such as metal inert gas welding or tungsten inert gas welding, can be used to integrate the sensing device 42 with the component 68. The carrier 44 and the wall 70 are formed of materials suitable for welding to one another. For instance, in one embodiment the carrier 44 is a 625 Nickel alloy and the wall 70 is steel. Excess transfer of heat to the sensor module 46 while welding the carrier 44 to the component 68 could negatively impact operation of the integrated sensing device 42. A butter welding technique can be used in which a layer of weld metal is applied to one or both of the surfaces to be welded before actually welding the two surfaces to one another, which may reduce the amount of heat transferred to the sensor module 46. For instance, a portion of the wall 70 about the recess 72 can be "buttered" with a layer of weld metal before welding the carrier 44 to the wall 70 (or even before positioning the carrier 44 in the recess 72). The two surfaces can then be welded together, with the previously applied layer of weld metal facilitating the welding of the carrier 44 to the wall 70. This buttering technique can be used to integrate the sensing device 42 into various pressure bodies that may or may not have internal bores or surfaces clad with corrosion-resistant alloys. And in at least some instances the resulting weld joint between the carrier 44 and the wall 70 does not require post-welding heat treatment, thereby eliminating heat distortion from such a treatment that could negatively impact the sensor module 46.

Figure 7:
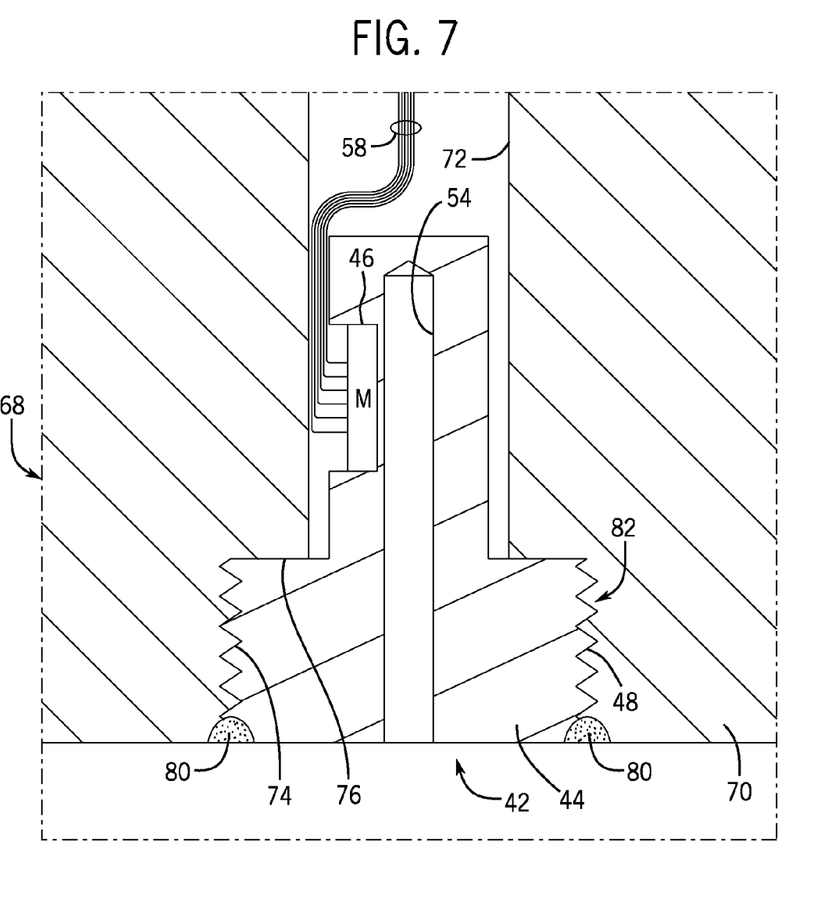

Another embodiment having a sensing device 42 integrated in a component 68 is depicted in FIG. 7. In this example, mating threads on the flange 48 and the recess 74 form a threaded interface 82, which allows the sensing device 42 to be threaded into the recess 74. The sensing device 42 and the component 68 can then be welded together as discussed above. And while it is the flange 48 of the carrier 44 that is threaded in the present figure, other portions of the carrier 44 could also or instead be threaded. For example, the carrier 44 could be formed without a flange 48 and have exterior threads for engaging complementary internal threads in a recess of the component 68. Whether provided on the flange 48 or some other portion of the carrier 44, the threaded connection between the sensing device 42 and the component 68 can distribute internal pressure load away from the weld 80, thereby reducing stress on the weld 80 and re-enforcing the integration of the sensing device 42 in the component 68.

As generally noted above, the sensing device 42 can be integrated into a wide variety of components. In two embodiments generally depicted in FIGS. 8 and 9, the sensing device 42 is depicted as integrated into valve actuation assemblies. But these examples are provided merely for explanatory purposes, and the sensing devices 42 could instead be installed in other portions of valves or in other components, such as in pipes, Christmas tree components, or wellhead components, to name but a few possibilities.

Figure 8:
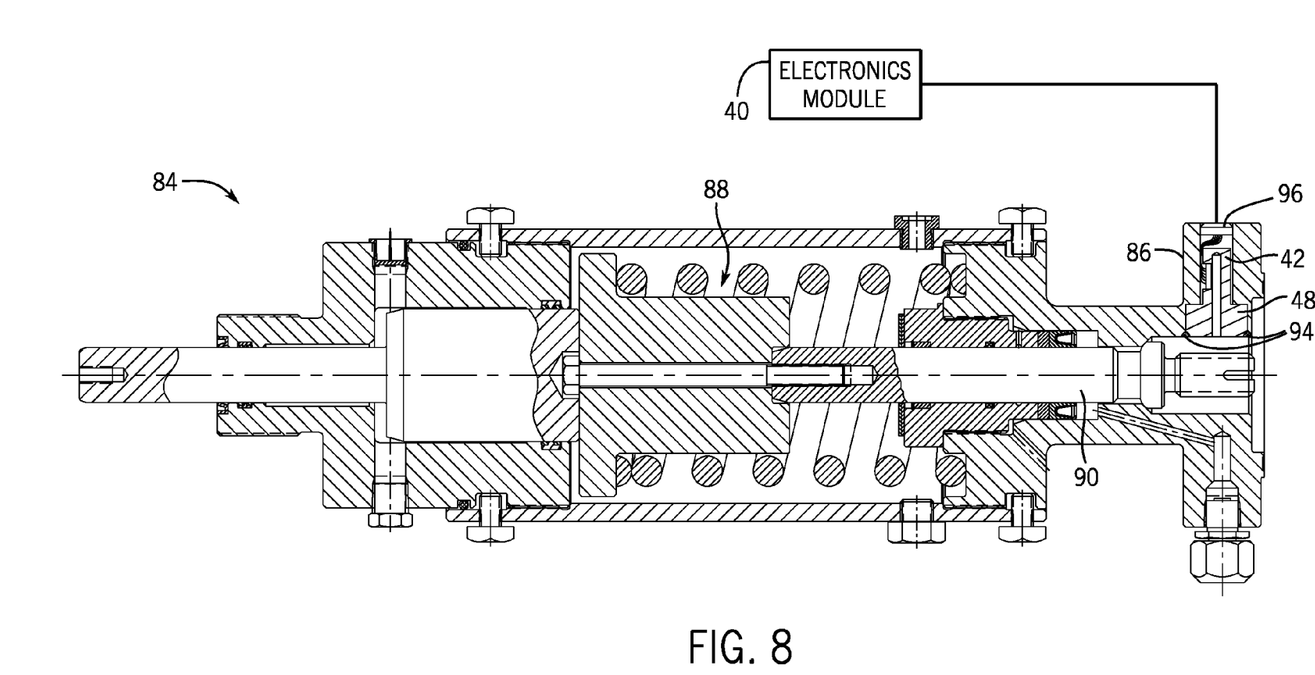
FIG. 8 depicts the sensing device of FIG. 3 welded into a bonnet of a valve actuation assembly and oriented perpendicular to the axis of the assembly in accordance with one embodiment.

In FIG. 8, a valve actuation assembly 84 includes a bonnet 86 for connecting the assembly 84 to the main body (not shown) of a valve. The assembly 84 includes an actuator 88 connected to a stem 90 for moving a valve part, such as a gate. Although the sensing device 42 could be integrated into other portions, the sensing device 42 is shown here as integrated into the bonnet 86 in a direction perpendicular to the axis of the actuator (corresponding to the direction of movement of the stem 90). A weld 94 joins the sensing device 42 to the bonnet 86, forming an integral pressure boundary along the surface of the sensing device 42 and the bonnet 86. The sensor module of the sensing device 42 is wired to a cap 96 that is electrically connected with an electronics module 40 to enable signals to be passed between the sensing device 42 and the electronics module 40 through the cap 96.

Figure 9:
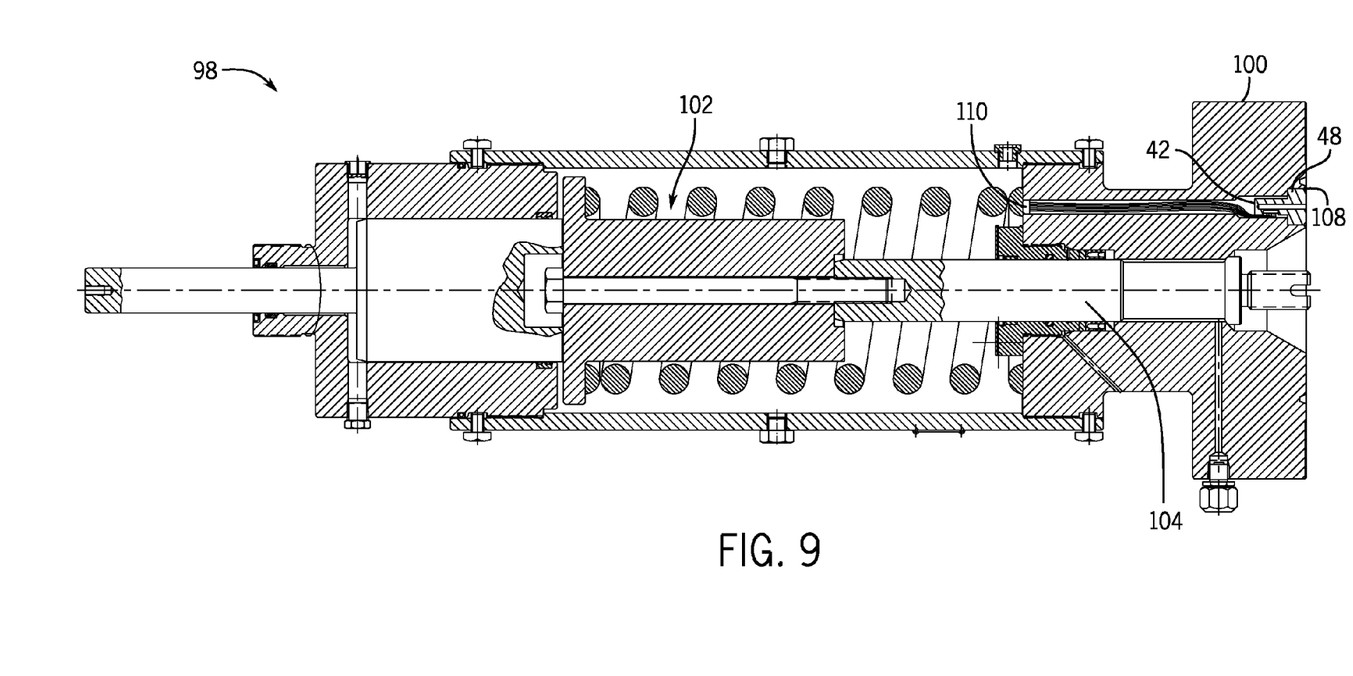
FIG. 9 depicts the sensing device of FIG. 3 welded into a bonnet of a valve actuation assembly and oriented parallel to the axis of the assembly in accordance with another embodiment.

In FIG. 9, a valve actuation assembly 98 includes a bonnet 100, an actuator 102, and a stem 104. The valve actuation assembly 98 functions similarly to the actuation assembly 84 of FIG. 8 but is larger. Because of this increased size, the sensing device 42 can be integrated into the bonnet 100 in a direction parallel to the axis of the actuator. Weld 108 joins the sensing device 42 with the bonnet 100 in an integral manner to avoid potential leak paths associated with a seal. Like in FIG. 8, the sensing device 42 is wired to a cap 110 in FIG. 9, which can also be electrically connected to an electronics module 40 as described above.

The type of weld used to join the sensing device 42 into a component 68 can vary as desired, such as based on their relative orientation. For instance, with both the flanged end of the sensing device 42 and the adjacent portion of the bonnet 100 presenting even, flat faces, the weld 108 is provided as a butt weld in one embodiment. In contrast, with the sensing device 42 installed in a curved, inner perimeter of the bonnet 86 in FIG. 8, the weld 94 is instead provided as a fillet weld in one embodiment.

Figure 10:
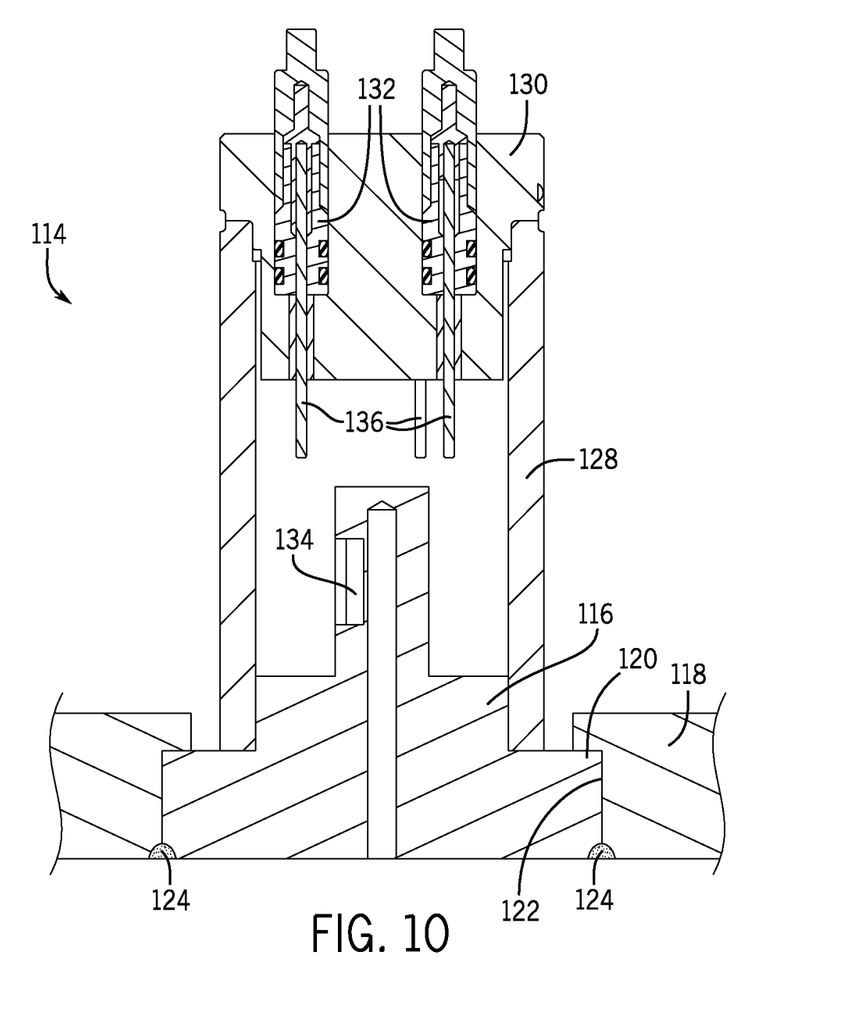
FIG. 10 illustrates a sensing device installed in a pipe and having a separate housing and glass bead with electrical pins to facilitate connection of the sensing device to other circuitry in accordance with one embodiment.

In another embodiment generally depicted in FIG. 10, an apparatus 114 includes a sensing device 116 installed in a pipe 118. The device 116 includes a carrier with a flange 120 received in a counterbore 122 and integrated into the pipe 118 via weld 124. Like the previous examples, the sensing device 116 and the pipe 118 present an integral pressure barrier capable of containing pressurized fluid within the pipe 118 without a separate gasket or other seal element.

A sensing device may be longer than the portion of a component in which the sensing device is to be installed. For example, the sensing device 116 in FIG. 10 extends beyond the outer edge of the pipe 118. To accommodate such an arrangement, the apparatus 114 includes a housing 128 sealed with a glass bead 130. The housing 128 protects sensors of the device 116 from impact and can be attached to the sensing device 116 or to the pipe 118 in any suitable manner, such as by welding. The glass bead 130 and the housing 128 provide a second pressure barrier in case of pressurized fluid leaking into the cavity about the sensor module 134. Glass beads could also be used to enclose a cavity without a housing 128. For example, the caps 96 and 110 described above could be glass beads similar to that depicted here in FIG. 10.

The glass bead 130 includes pin assemblies 132 that facilitate electrical connections between a sensor module 134 and other electrical components (e.g., an electronics module 40). The pin assemblies 132 include electrical pins 136 that serve as a robust wiring connection to both the sensor module 134 and the other electronic components outside of the housing 128. The housing 128 and glass bead 130 generally enclose a cavity about the sensor module 134 and protect electrical connections between the sensor module 134 and the pins 136. The sensor module 134 can be wired to the portions of the pins 136 within the housing 128, and opposite ends of the pins 136 can be connected to other electronic devices, such as a wireless modem for transmitting measurement signals from the sensor module 134.

Figure 11:
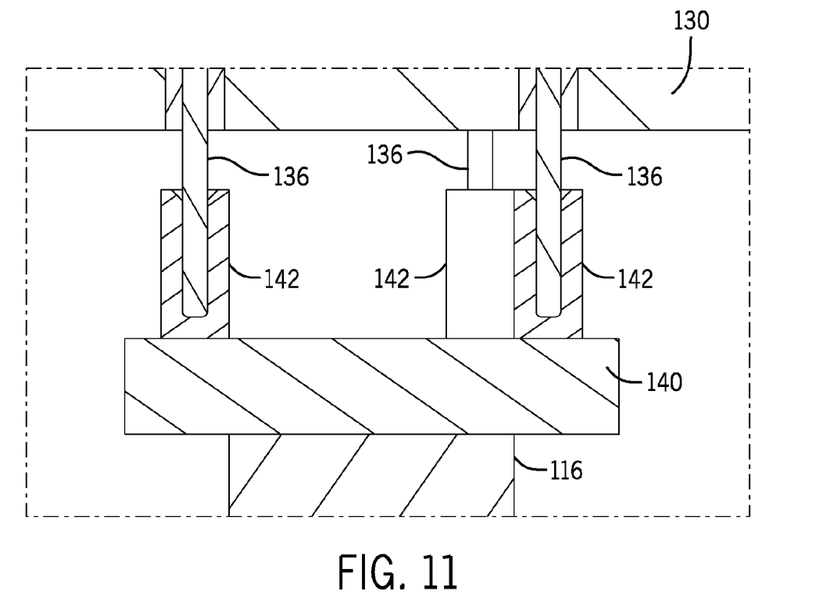
FIG. 11 depicts an assembly in which a printed circuit board is mounted to the sensing device and has electrical sockets to receive the pins of the glass bead of FIG. 10 in accordance with one embodiment.

Although the sensor module 134 can be wired directly to the pins 136, these components could be connected in other ways. As depicted in FIG. 11, for example, the pins 136 could instead be inserted into sockets 142 of a printed circuit board 140. This printed circuit board 140 can be mounted on the sensing device 116 or elsewhere within the cavity. The printed circuit board 140 includes sockets 142 for receiving the pins 136. Wires from the sensor module 134 can be connected (e.g., soldered) to the printed circuit board 140 to electrically connect the sensor module 134 with the sockets 142 and external devices (e.g., an electronics module 40) via the pins 136.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system comprising:
a sensor installed on a carrier; and
a component having a body for receiving a fluid;
wherein the carrier is integrated into the component to enable the sensor to detect one or more characteristics of the fluid, and the carrier is integrated into the component such that the carrier and the component collectively present a fully integral pressure boundary that isolates the sensor from the fluid without a seal connection, wherein the component is an oilfield component and the system includes a welded interface between the carrier and the oilfield component.

2. The system of claim 1, wherein the carrier includes a flange positioned within a recess of the component and welded to the component.

3. The system of claim 1, comprising an electronic module communicatively connected to the sensor and positioned apart from the component.

4. The system of claim 1, wherein the sensor is adhered to the carrier.

5. The system of claim 1, wherein the carrier is positioned within a bore of the component, the system further comprising a glass bead that seals an end of the bore, and wherein the sensor is communicatively connected to an electronic module via pins in the glass bead.

6. The system of claim 5, wherein the pins of the glass bead are communicatively connected to the sensor via a printed circuit board.

7. The system of claim 6, wherein the pins of the glass bead are installed in pin-receiving sockets on the printed circuit board.

8. The system of claim 1, wherein the sensor includes at least one of a temperature sensor or a pressure sensor.

9. The system of claim 1, comprising a housing with one end attached to the carrier and another end sealed by a glass bead that includes pins electrically coupled to the sensor installed in the carrier.

10. The system of claim 1, wherein the component includes a valve.

11. A system comprising:
a pressure-containing vessel;
a sensing system including a detector module integrally welded to the pressure-containing vessel and an electronics module for receiving data from the detector module, wherein the detector module is positioned within a bore of the pressure-containing vessel and is integrally welded to the pressure-containing vessel at a first end of the bore; and
a cap coupled to the pressure-containing vessel at a second end of the bore opposite the first end, wherein the cap is electrically connected with the detector module and with the electronics module so as to enable signals to be passed between the detector module and the electronics module through the cap.

12. The system of claim 11, wherein the detector module includes a pressure sensor and a temperature sensor.

13. The system of claim 11, wherein the detector module includes a sensor, a carrier housing the sensor, and a printed circuit board mounted on the carrier and electrically coupled to the sensor.

14. The system of claim 11, wherein the pressure-containing vessel includes a valve actuator and the detector module is integrally welded into a bonnet of the valve actuator.

15. The system of claim 11, wherein the electronics module is positioned apart from pressure-containing vessel.

16. A method comprising:
installing a sensor housing into a pressure-containing wall of a component; and
integrating the sensor housing into the pressure-containing wall by welding the sensor housing to the pressure-containing wall to form a pressure-containing interface between the sensor housing and the pressure-containing wall, wherein welding the sensor housing to the pressure-containing wall includes welding the sensor housing to a pressure-containing surface of the pressure-containing wall such that the pressure-containing wall and the sensor housing provide a fully integral pressure boundary along the pressure-containing wall across the sensor housing.

17. The method of claim 16, comprising buttering the pressure-containing wall before welding the sensor housing to the pressure-containing wall to facilitate formation of the pressure-containing interface during welding of the sensor housing to the pressure-containing wall.

18. The method of claim 17, comprising:
installing a detector module having a sensor into the sensor housing; and
connecting the detector module to a remote electronics module to enable communication between the detector module and the remote electronics module.

19. The method of claim 18, comprising:
electrically coupling the detector module to pins through a glass bead; and
sealing a cavity about the detector module with the glass bead.

* * * * *